(12) United States Patent  
Mader

(10) Patent No.: US 6,459,245 B1  
(45) Date of Patent: Oct. 1, 2002

(54) VOLTAGE SUPPLY FOR A SENSOR UNIT AND ACCELERATION SENSOR UNIT WITH SUCH A VOLTAGE SUPPLY

(75) Inventor: Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/776,962

(22) Filed: Feb. 5, 2001

(30) Foreign Application Priority Data

Aug. 16, 2000 (DE) .......................................... 100 39 949

(51) Int. Cl.$^7$ .............................. G05F 1/40; G05F 1/44; G05F 1/56
(52) U.S. Cl. .................. 323/266; 330/69; 330/174; 330/253; 330/266
(58) Field of Search .......................... 330/174, 69, 253; 323/266

(56) References Cited

U.S. PATENT DOCUMENTS 5,548,273 A  *  8/1996  Nicol et al. .................. 340/439
6,246,287 B1 *  6/2001  Yamashita .................. 330/174

* cited by examiner

Primary Examiner—Bao Vu
(74) Attorney, Agent, or Firm—Laurence A. Greenberg; Werner H. Stemer; Ralph E. Locher

(57) ABSTRACT

A voltage supply unit which operates at an internal switching frequency and has a capacitor connected in parallel with its output is connected to the input of a sensor unit operating at an internal switching frequency. The connecting line contains a resistor which, together with a capacitor connected in parallel with the input, forms a filter.

10 Claims, 3 Drawing Sheets

A 100 kHz
28 mV

1) Ch 1: 10 mVolt 5 us

B

±1 digit
(8 Bit / μC)

approx.
200 kHz
17 mV

1) Ch 2: 5 mVolt 25 ms

C noise

1) Ch 2: 5 mVolt 1 ms

A  100 kHz 28 mV
1) Ch 1: 10 mVolt 5 us

B  after RC-Filter 12mV
1) Ch 1: 5 mVolt 5 us

C  ±1 digit $\begin{pmatrix}8\text{ Bit}\\ \mu C\end{pmatrix}$  approx. 200 kHz 9 mV
1) Ch 2: 5 mVolt 5 ms

VOLTAGE SUPPLY FOR A SENSOR UNIT AND ACCELERATION SENSOR UNIT WITH SUCH A VOLTAGE SUPPLY

BACKGROUND OF THE INVENTION

Field of the Invention

The invention relates to a voltage supply for a sensor unit, particularly an acceleration sensor unit in an occupant protection system in a motor vehicle, with a voltage supply unit which operates at an internal switching frequency having a capacitor connected in parallel with the output, with a sensor unit which operates at an internal switching frequency and having at least one capacitor connected in parallel with the power supply input, with a line connecting the output of the voltage supply unit to the power supply input of the sensor unit and with a filter having a filter component contained between the branch points of the capacitors in the line.

FIG. 6 shows a known voltage supply. A voltage supply unit 10 operating at an internal switching frequency is connected to a sensor unit 14 via a line 12. The sensor unit 14 contains, by way of example, an acceleration sensor, such as is used in occupant protection systems in motor vehicles. Such acceleration sensors usually operate with a switched capacitor filter (not shown) and are sensitive to voltage fluctuations, particularly if their switching frequency matches the switching frequency of the voltage supply unit or matches a multiple thereof. In principle, there is always a risk when the switching frequency of the sensor unit or an integer multiple thereof matches the switching frequency of the voltage supply unit or matches an integer multiple thereof.

Examples of causes of fluctuations in the supply voltage produced at the output of the supply voltage unit 10 are:
1) cyclic voltage fluctuations in time with the switching frequency;
2) random noise;
3) short voltage spikes.

The cyclic interference, in particular, is critical for the sensor. Random noise is not tied to any particular frequency and the switching spikes can be blocked out by a simple ceramic capacitor directly at the input of the sensor unit.

If the sensor unit reacts to voltage fluctuations, this can result in erroneous signals at the sensor output which, in turn, can cause the following problems:
a) a routinely executed sensor test reports errors;
b) a crash algorithm is triggered;
c) the acceleration signal measured by the sensor is corrupted by interference.

To eliminate problem type c), the voltage transmitted over the line 12 is filtered such that the corruptions in the sensor output signal which are caused by voltage fluctuations do not exceed an acceptable degree. Such filtering likewise eliminates problems a) and b).

For the purpose of filtering, besides possible other components, a smoothing capacitor 18 of, typically, 10 to 100 μF is connected in parallel with the output 16 of the voltage supply unit 10 (FIG. 6), whose output voltage is typically 5 V. Upstream of the smoothing capacitor's branch point, there is typically an inductor (not shown). Connected in parallel with the power supply input 20 of the sensor unit 14 is a capacitor 22 which is present for reasons of electromagnetic compatibility and additionally further reduces switching spikes not suppressed by the smoothing capacitor 18 in the frequency range from approximately 100 kHz to a few MHz. The capacitor 22 typically has a capacitance of from 10 to 100 nF. In addition, there is an LC filter comprising a coil 24 and a capacitor 26, in particular for the purpose of suppressing the cyclic voltage fluctuations which arise in time with the switching frequency of the voltage unit 10. The inductance of the coil is typically between 10 and 100 μH; the capacitance of the capacitor is between 10 and 100 μF, for example. The circuit shown in FIG. 6 is used to produce, for a switching frequency in the voltage supply unit 10 in the region of 100 kHz and switching frequencies in the acceleration sensor 14 in the region of 70 kHz, a voltage constancy at the input 20 of the sensor unit 14 which ensures the operational reliability of the sensor unit 14.

On account of their high capacitances, the capacitors 18 and 26 are typically tantalum capacitors. The capacitor 22 is typically a ceramic capacitor on account of the RF response.

One problem of the circuit shown in FIG. 6 is that it is comparatively complex on account of the LC filtering.

SUMMARY OF THE INVENTION

It is accordingly an object of the invention to provide a voltage supply for a sensor unit and an acceleration sensor unit with such a voltage supply, which overcomes the hereinafore-mentioned disadvantages of the heretofore-known devices of this general type and which can be produced economically and with little complexity while having a high level of operational reliability.

With the forgoing and other objects in view there is provided, in accordance with the invention, a voltage supply for a sensor unit, comprising a voltage supply unit operating at an internal switching frequency and having an output, a first capacitor connected in parallel with the output forming a branch point, a sensor unit operating at an internal switching frequency and having a power supply input and at least one second capacitor connected in parallel with the power supply input forming another branch point, a line connecting the output of the voltage supply unit to the power supply input of the sensor unit, a filter having a filter component contained between the branch points of the capacitors in the line and the filter component being formed by a resistor connected together with the second capacitor being connected in parallel with the power supply input of the sensor to form the filter.

It has been found, surprisingly, that the complex LC filter described with reference to FIG. 6 can be replaced with a simple nonreactive resistor without there being any risk of impermissibly large voltage fluctuations arising at the input of the sensor unit 14 which could threaten fault-free operation of the sensor unit 14. If required, the capacitance of the filter capacitor needs to be increased in relation to that of the capacitor used in the prior art, which can also be done by connecting a plurality of capacitors in parallel, e.g. 3 times 470 nF.

In accordance with another feature of the invention, a sensor unit is one of a plurality of sensor units connected in parallel on the line. This relates to an advantageous development of the voltage supply according to the invention, with the filter being able to have just one resistor in accordance with the resistor forming part of the filter is common to all of the sensor units.

In accordance with a further feature of the invention, a second capacitor connected in parallel with said power supply input of said sensor unit is a ceramic capacitor.

In accordance with an additional feature, the filtered voltage may advantageously be used as reference voltage for a microcontroller which is used for converting the output signals from the sensor unit(s).

With the objects of the invention in view, there is also provided an acceleration sensor unit for an occupant protection system in a motor vehicle including a voltage supply, comprising a voltage supply unit operating at an internal switching frequency and having an output, a first capacitor connected in parallel with the output forming a branch point, a sensor unit operating at an internal switching frequency and having a power supply input and at least one second capacitor connected in parallel with the power supply input forming another branch point, a line connecting the output of the voltage supply unit to the power supply input of the sensor unit, a filter having a filter component contained between the branch points of the capacitors in the line and the filter component being formed by a resistor connected together with the second capacitor being connected in parallel with the power supply input of the sensor to form the filter.

The invention may be used to advantage anywhere where natural frequencies of a voltage supply unit, which cause voltage fluctuations, are adversely superimposed on natural frequencies of a sensor unit (harmonics).

Other features which are considered as characteristic for the invention are set forth in the appended claims.

Although the invention is illustrated and described herein as embodied in a voltage supply for a sensor unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

In the description below, the same reference symbols as in FIG. 6 are used for components whose function is similar or the same.

DESCRIPTION OF THE PREFERRED EMBODIMENTS

Figure 1:
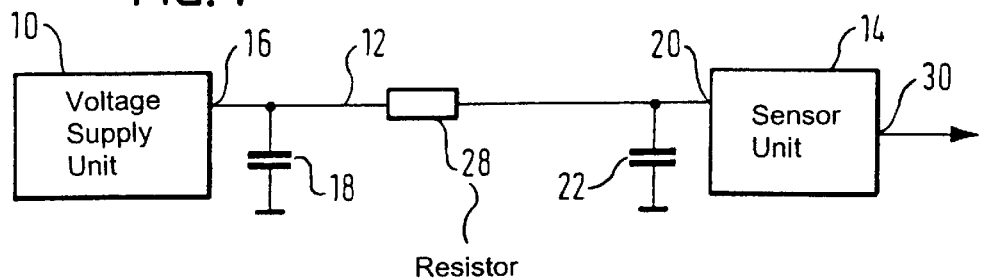
FIG. 1 shows a block diagram of a voltage supply according to the invention.
Figure 6:
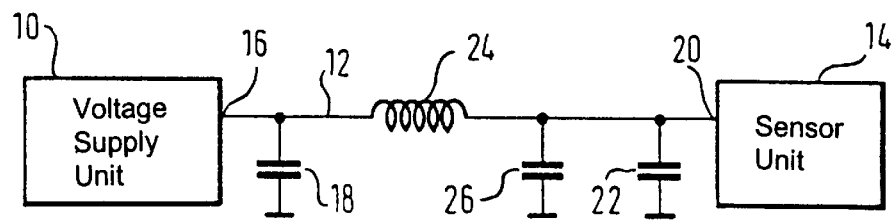
FIG. 6 shows the voltage supply in accordance with the prior art, as has already been explained.

Referring now to the figures of the drawings in detail and first, particularly, to FIG. 1 thereof, there is seen a circuit shown whichs differs from that shown in FIG. 6 by virtue of the fact that the LC filter (24, 26) shown in FIG. 6 is replaced with a single nonreactive resistor 28. By way of example, for an output voltage from the voltage supply unit 10 of 5 V and for the switching frequencies and sizes of the capacitors 18 and 22 as described above with reference to FIG. 6, this resistor is approximately 10 ohms. It has been found, surprisingly, that this simple filter, in which the resistor 28 and the capacitor 22 form an RC filter, said capacitor 22 preferably being made of ceramic and being present anyway for reasons of electromagnetic compatibility, reduces voltage fluctuations from the output of the voltage supply unit 10 to a degree for which the sensor unit 14 is sufficiently nonsensitive.

Figure 2:
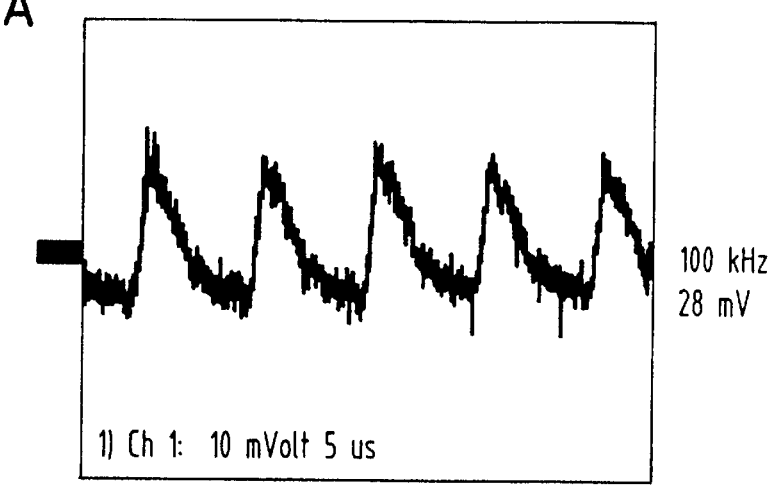
FIGS. 2 and 3 show signal profiles to explain the operation of the voltage supply shown in FIG. 1, FIGS. 4 and 5 show block diagrams of two modified embodiments of circuits.
Figure 2:
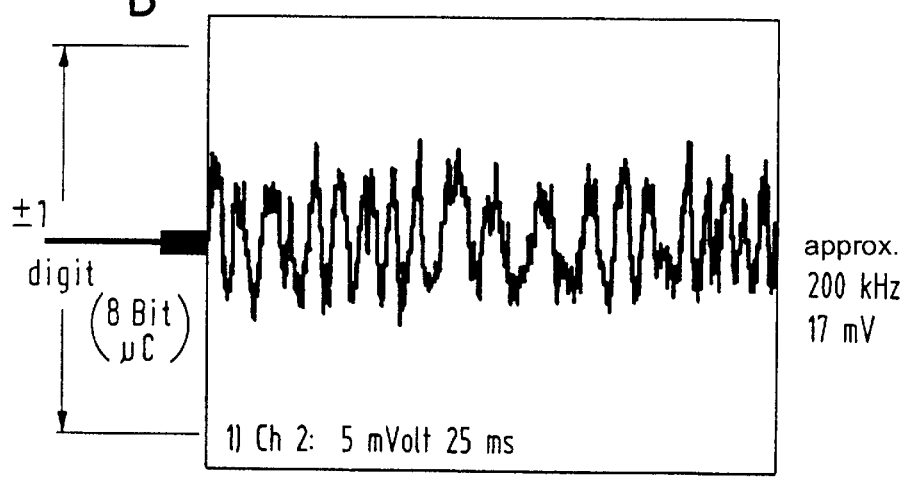
Figure 2:
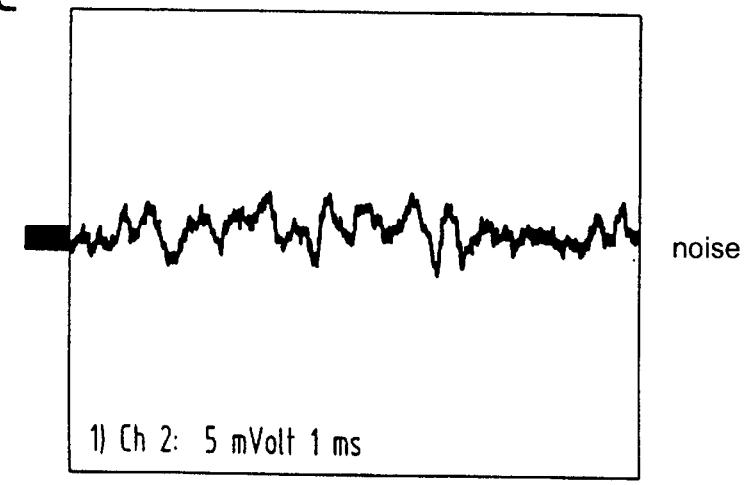

FIG. 2 shows signal profiles as measured without any filtering. The abscissa indicates the respective time, and the ordinate indicates the voltage fluctuation. The text in the boxes indicates the instrument setting.

Graph A shows cyclic voltage fluctuations at the output 16 of the voltage supply unit 10, said voltage fluctuations having an amplitude of 28 mV and a frequency of 100 kHz in the example shown.

Graph B shows the voltage profile at the output 30 (FIG. 1) of the sensor unit 14 at a frequency of approximately 200 kHz, that is to say with superimposition of, by way of example, the second harmonic of the switching frequency of the voltage supply unit 10 and the third harmonic of the switching frequency of the sensor unit 14 for the instance in which there is no filter. The amplitude is approximately 17 mV. To the left of graph B, the amplitude of the voltage fluctuations for which an acceleration signal produced is corrupted by less than +/−1 digit is shown.

Graph C shows random noise at the sensor output 30 without a filter, specifically in a frequency range in which no harmonics encounter one another or are superimposed on one another. As can be seen, the amplitude which is predominant there is not critical.

Figure 3:
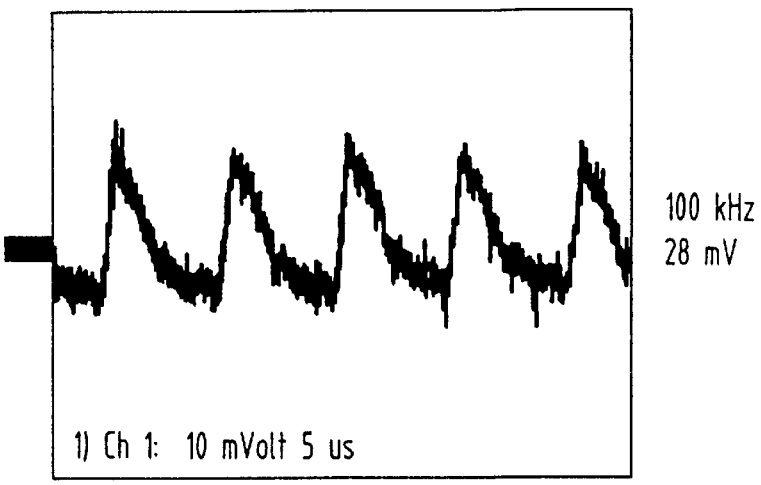
Figure 3:
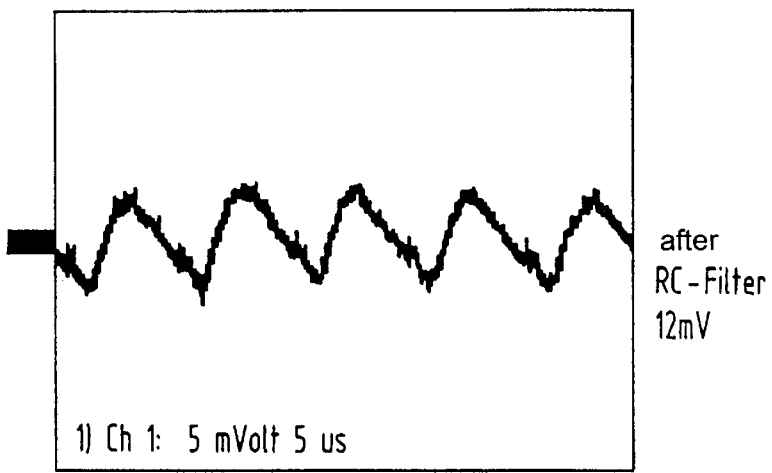
Figure 3:
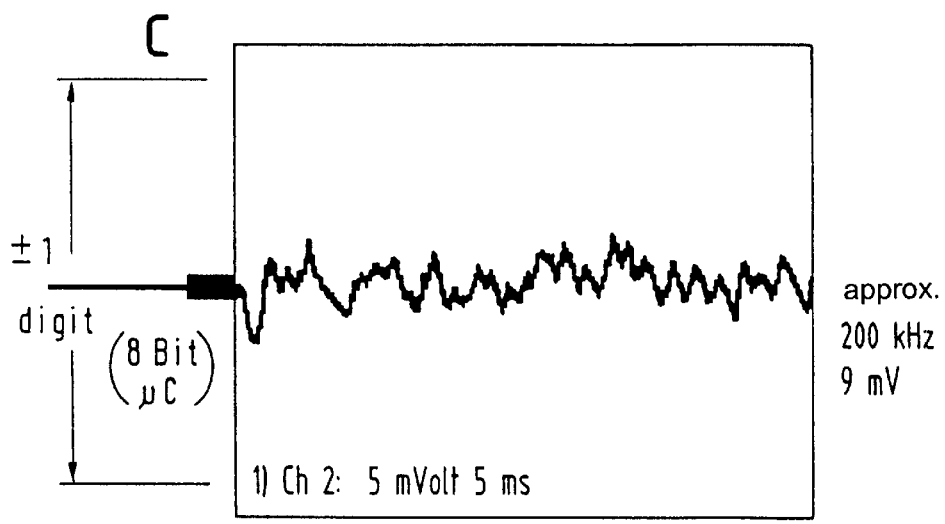

FIG. 3 shows the case in which the filter provided is the resistor 28 in combination with the capacitor 22 shown in FIG. 1. Graph A is the same as graph A in FIG. 2. The signal tap-off point for the output voltage from the voltage supply unit 10 is upstream of the resistor 28. Graph B shows the amplitude of the signal at the power supply input 20 of the sensor unit 14. As can be seen, the voltage fluctuation is much reduced as compared with the signal profile shown in A, as a result of which the interference immunity is increased.

Graph C shows the signal profile at the output 30 of the sensor unit 14 at a frequency of approximately 200 kHz, and is thus equivalent to graph B in FIG. 2. As can be seen, the interference at the sensor output is less than +/−0.5 digit and is approximately equivalent to the random noise in FIG. 2C.

As can be seen from the above, the RC filter (22, 28) provided in accordance with the invention is used to obtain a voltage supply which ensures a high degree of error immunity while being of economical design.

Figure 4:
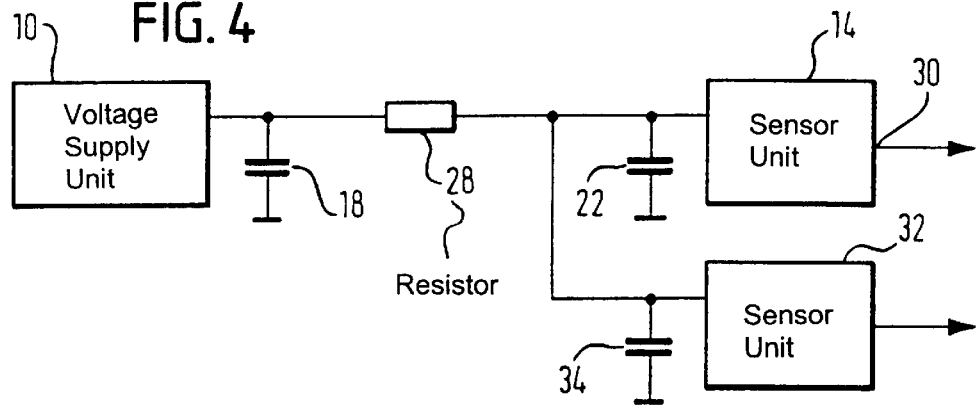

FIG. 4 shows a development of the arrangement shown in FIG. 1, in which two sensor units 14, 32 connected in parallel are supplied jointly by the voltage supply unit 10. Like the sensor unit 14, the sensor unit 32 has a capacitor 34 connected in parallel with its input for reasons of electromagnetic compatibility. The resistor 28 forms, together with the capacitors 22 and 34, an RC filter. In the case shown in FIG. 4, the size of the resistor 28 is preferably half that of the resistor in the case shown in FIG. 1, i.e. the resistor 28 in FIG. 4 is approximately 5 ohms, for example.

According to the required strength of filtering, larger or smaller resistors may be used. The capacitance of the ceramic capacitors 22 and 34 may also be increased if required, in which case it may be advantageous for cost reasons to use a plurality of small capacitors connected in parallel, instead of one large capacitor.

Figure 5:
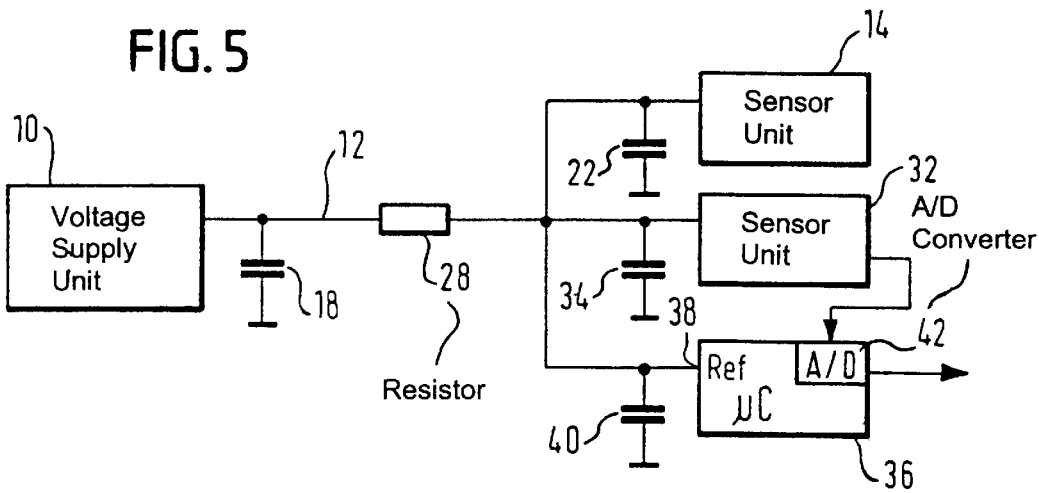

FIG. 5 shows a further embodiment of the circuit, which, as compared with the embodiment shown in FIG. 4, is supplemented by the fact that a microcontroller 36 is connected downstream of the resistor 28 on the line 12, in parallel with the sensor units 14 and 32. The microcontroller 36 has a reference voltage input 38 which is supplied with a filtered or smoothed voltage by the voltage supply unit 10. The filtering is carried out by means of the resistor 28 and the parallel circuit comprising the capacitors 22, 34 and 40, the capacitor 40 being in parallel with the reference voltage input 38.

The microcontroller 36 contains an A/D converter 42 to which, in the example shown, the analog output signal from the sensor unit 32 is supplied in order to be available as a digital output signal for further processing. The drawing does not show an output line from the sensor unit 14, whose output signal can likewise be subjected to analog/digital conversion by the microcontroller.

It goes without saying that other types of microcontroller may also be provided.

Advantageously, the capacitors 22, 34 and 40 used, together with the resistor 28, for filtering are arranged as close as possible to the respective inputs of the units 14, 32 and 36, which increases their effectiveness in terms of improving electromagnetic compatibility. If this physical closeness is not absolutely necessary for EMC reasons, there is no need for each sensor unit or each microcontroller to have a dedicated capacitor.

I claim:

1. A voltage supply for a sensor unit, comprising:

a voltage supply unit operating at an internal switching frequency and having an output;

a first capacitor connected in parallel with said output forming a branch point;

a sensor unit operating at an internal switching frequency and having a power supply input;

at least one second capacitor connected in parallel with said power supply input forming another branch point;

a line connecting said output of said voltage supply unit to said power supply input of said sensor unit;

a filter having a filter component contained between said branch points of said capacitors in said line; and said filter component being formed by a resistor connected together with said second capacitor being connected in parallel with said power supply input of said sensor to form said filter.

2. The voltage supply according to claim 1, wherein:

said sensor unit is one of a plurality of sensor units connected in parallel on said line.

3. The voltage supply according to claim 2, wherein:

said resistor forming part of said filter is common to all of said sensor units.

4. The voltage supply according to claim 1, wherein:

said second capacitor connected in parallel with said power supply input of said sensor unit is a ceramic capacitor.

5. The voltage supply according to claim 2, wherein:

said second capacitor connected in parallel with said power supply input of said sensor unit is a ceramic capacitor.

6. The voltage supply according to claim 3, wherein:

said second capacitor connected in parallel with said power supply input of said sensor unit is a ceramic capacitor.

7. The voltage supply according to claim 1, wherein:

said second capacitor connected in parallel with said power supply of said sensor unit is disposed physically close to said power supply input.

8. The voltage supply according to claim 1, including:

a microcontroller having a reference voltage input connected to said line and connected on said line in parallel with said sensor unit.

9. The voltage supply according to claim 8, wherein:

said microcontroller contains an A/D converter for converting analog output signals from said sensor unit into digital output signals.

10. An acceleration sensor unit for an occupant protection system in a motor vehicle including a voltage supply, comprising:

a voltage supply unit operating at an internal switching frequency and having an output;

a first capacitor connected in parallel with said output forming a branch point;

a sensor unit operating at an internal switching frequency and having a power supply input;

at least one second capacitor connected in parallel with said power supply input forming another branch point;

a line connecting said output of said voltage supply unit to said power supply input of said sensor unit;

a filter having a filter component contained between said branch points of said capacitors in said line; and said filter component being formed by a resistor connected together with said second capacitor being connected in parallel with said power supply input of said sensor to form said filter.

* * * * *